United States Patent [19]

Youngner

[11] Patent Number: 5,242,548
[45] Date of Patent: Sep. 7, 1993

[54] VACUUM DISTILLATION APPARATUS

[76] Inventor: Philip G. Youngner, 919 - 18th St. S.E., St. Cloud, Minn. 56301

[21] Appl. No.: 787

[22] Filed: Jan. 4, 1993

Related U.S. Application Data

[63] Continuation of Ser. No. 655,557, Feb. 14, 1991, abandoned, which is a continuation of Ser. No. 532,950, Jun. 4, 1990, abandoned, which is a continuation of Ser. No. 422,239, Oct. 5, 1989, abandoned, which is a continuation of Ser. No. 234,213, Aug. 19, 1988, abandoned.

[51] Int. Cl.$^5$ .......................... B01D 3/10; B01D 5/00
[52] U.S. Cl. .......................... 202/185.100; 159/901; 159/DIG. 16; 159/DIG. 40; 202/181; 202/182; 202/202; 202/205; 203/1; 203/94; 203/98; 203/DIG. 18
[58] Field of Search ............... 202/185.1, 181, 182, 202/202, 205; 203/1, 94, 98, DIG. 18; 159/901, DIG. 16, DIG. 40

[56] References Cited

U.S. PATENT DOCUMENTS

| | | | |
|---|---|---|---|
| 2,499,158 | 2/1950 | Perry | 202/205 |
| 3,318,784 | 5/1967 | Murphy | 203/11 |
| 3,334,027 | 8/1967 | Goeldner | 202/200 |
| 3,390,057 | 6/1968 | Day | 203/11 |
| 3,674,652 | 7/1972 | Brown | 202/205 |
| 3,725,206 | 4/1973 | Foley | 203/11 |
| 4,260,459 | 4/1981 | Kirschman | 202/200 |
| 4,269,664 | 5/1981 | Younger | 202/185.2 |
| 4,304,638 | 12/1981 | Smith | 202/202 |
| 4,444,623 | 4/1984 | Youngner | 202/205 |
| 4,525,243 | 6/1985 | Miller | 202/205 |
| 4,536,257 | 8/1985 | Atwell | 202/205 |
| 4,568,428 | 2/1986 | Rigg et al. | 202/181 |
| 4,686,009 | 8/1987 | McCabe | 202/181 |
| 4,762,593 | 8/1988 | Youngner | 202/205 |
| 4,770,748 | 9/1988 | Cellini et al. | 202/205 |

FOREIGN PATENT DOCUMENTS 2553098  4/1985  France .......................... 202/205

Primary Examiner—Virginia Manoharan
Attorney, Agent, or Firm—Lawrence M. Nawrocki

[57] ABSTRACT

An improved distillation device (1) which uses a combination of centrifugal and positive displacement pumps to purify raw liquid in an area of limited space. The device (1) includes evaporation assembly (2) having a boiling chamber (5), a valve and float switches (15, 16, 17) for maintaining the liquid level (20) in the boiling chamber (5) at a predetermined level, and connecting conduit (21) for directing vapor to a condensation apparatus (3). The condensation assembly (3) includes a condensation chamber (6), a collection chamber (7), and at least one bubble tube (22) connecting the two chambers (6, 7). Leading from the collection chamber (7) is first transfer conduit (50), a tube (51) for permitting vapor to bleed from the collection chamber (7) back to condensation chamber (6), and second transfer conduit (52) for returning only distillate from collection chamber (7) to condensation chamber (6) to cool condensation chamber (6).

18 Claims, 2 Drawing Sheets

5,242,548

VACUUM DISTILLATION APPARATUS

This is a continuation of copending application Ser. No. 07/655,557 filed on Feb. 14, 1991, abandoned, which is a continuation of application Ser. No. 07/532,950 filed on Jun. 4, 1990, abandoned, which is a continuation of application Ser. No. 07/422,239 filed on Oct. 5, 1989, abandoned, which is a continuation of application Ser. No. 07/234,213 filed on Aug. 19, 1988, abandoned.

FIELD OF THE INVENTION

The present invention is related to the field of distillation systems. More specifically, it deals with distillation apparatus which uses a unique combination of centrifugal and positive displacement pumps to purify large volumes of liquid in an area of limited space.

BACKGROUND OF THE INVENTION

Distillation is the process of vaporizing a substance, condensing the vapor and collecting the condensate, or distillate, in another container. This technique is useful for separating a mixture when the components have different boiling points. It is the principle method of purifying a liquid.

Four kinds of distillation techniques are available: simple, vacuum, fractional and steam distillation. Vacuum distillation, or distillation at reduced pressures, is the most efficient technique for mixtures with high boiling temperatures or with thermally sensitive components. The presence of a vacuum significantly reduces the temperatures needed for separation of the mixture. Moreover, economical low grade heat sources can be used because of the lower temperatures employed.

When using a vacuum distillation apparatus, the vacuum preferably should be generated by a liquid head rather than a vacuum pump to protect the final product's purity. However, to achieve the requisite intermediate or high vacuum with a liquid head, a significant amount of ceiling height is typically required to accommodate towers. This space is often not available.

A vacuum distillation apparatus which works well in areas of limited headroom was patented by Applicant in U.S. Pat. No. 4,444,623 on Apr. 24, 1984 and is incorporated by reference herein. However, in that apparatus the presence of air bubbles in the distillate required that the distillate pump be a positive displacement pump, such as a gear pump, which is able to pump a mixture of liquid and air. Inexpensive and high volume centrifugal pumps could not be used because the air, or other gas, tended to accumulate at the center of the impeller and block the flow of liquid through the pump, resulting in failure of the system.

Another shortcoming of the apparatus of the '623 patent is that it must be designed for operation at both start-up conditions as well as normal operating conditions. As a result, optimum operating performance is compromised for normal operating conditions.

Another vacuum distillation apparatus was disclosed by Applicant in U.S. Pat. No. 4,762,593. While the distillation apparatus in that patent can use centrifugal pumps, it does not completely overcome problems of limited available space. Rather, the total accumulated height of the bubble tubes in that apparatus must exceed 34 feet to achieve the requisite liquid head. If only three sections of bubble tubes are present, each section must reach approximately 12 feet in height. In addition, an additional foot at both the top and bottom of the distillation apparatus is typically necessary to accommodate the various pumps and condensing chambers. In an area of more limited ceiling height, shorter bubble tube sections may be used. With shorter bubble tubes, additional condensation sections are necessary to achieve the desired liquid head. As a result, the headroom problem may be resolved but the apparatus occupies additional floor space.

Therefore, a need exists for a distillation system that can be used in areas of limited space. A need also exists for a distillation system that can be designed for optimum performance in its normal running mode without a compromise in performance due to start-up conditions.

SUMMARY OF THE INVENTION

The present invention is an improvement to prior vacuum distillation systems. A system embodying the present invention comprises both evaporation apparatus and condensation apparatus. The evaporation apparatus evaporates a portion of raw liquid and the resulting vapor is cooled and condensed in the condensation apparatus for recovery. The evaporation apparatus comprises a generally vertical boiling chamber, means for supplying raw and circulated liquid to said boiling chamber, and means for maintaining the liquid level in said boiling chamber at a predetermined level. A connecting conduit directs vapors from the boiling chamber to the condensation apparatus. The condensation apparatus has a closed condensation chamber located generally above the boiling chamber and in fluid communication with the connecting conduit to receive, cool and condense the vapors to a distillate. At least one bubble tube is available for carrying a mixture of gas or vapor and distillate from the condensation chamber to a closed collection chamber. There are two paths, in the preferred embodiment, leading from the closed collection chamber. First means are provided for transferring a mixture of vapor or gas and distillate, via a positive displacement pump, from the closed collection chamber to an open container. At the open container the gas or vapor escapes directly into the atmosphere leaving the final distillate product. In addition, second means for transferring distillate only is provided to supply cooled distillate from the closed collection chamber to the condensation chamber for condensing gas or vapor from the boiling chamber.

The first transfer means employs a positive displacement pump such as a gear pump, and the second transfer means employs a centrifugal pump. The centrifugal pump rapidly circulates large volumes of liquid to the condensation chamber and greatly increases the efficiency of the system. The positive displacement pump handles mixtures of air and liquid against a relatively high pressure differential, a feature that cannot be performed by a centrifugal pump.

In a preferred embodiment, use of a tube interconnecting the closed collection chamber and the condensation chamber makes it possible for the distillation apparatus to proceed from start-up conditions to normal operating conditions without complex controls or a compromise in optimum performance. The tube channels gas and/or vapors upwardly from the closed collection chamber to the condensation chamber.

Various features and advantages obtained in view of those features are pointed out with particularity in the attached claims. However, for better understanding of the invention, its advantages and objects obtained by its use, reference also should be made to the drawing which forms a further part of this disclosure, and to the accompanying DETAILED DESCRIPTION OF THE INVENTION which illustrates and describes the preferred embodiment of the invention.

DETAILED DESCRIPTION OF THE INVENTION

Figure 1:
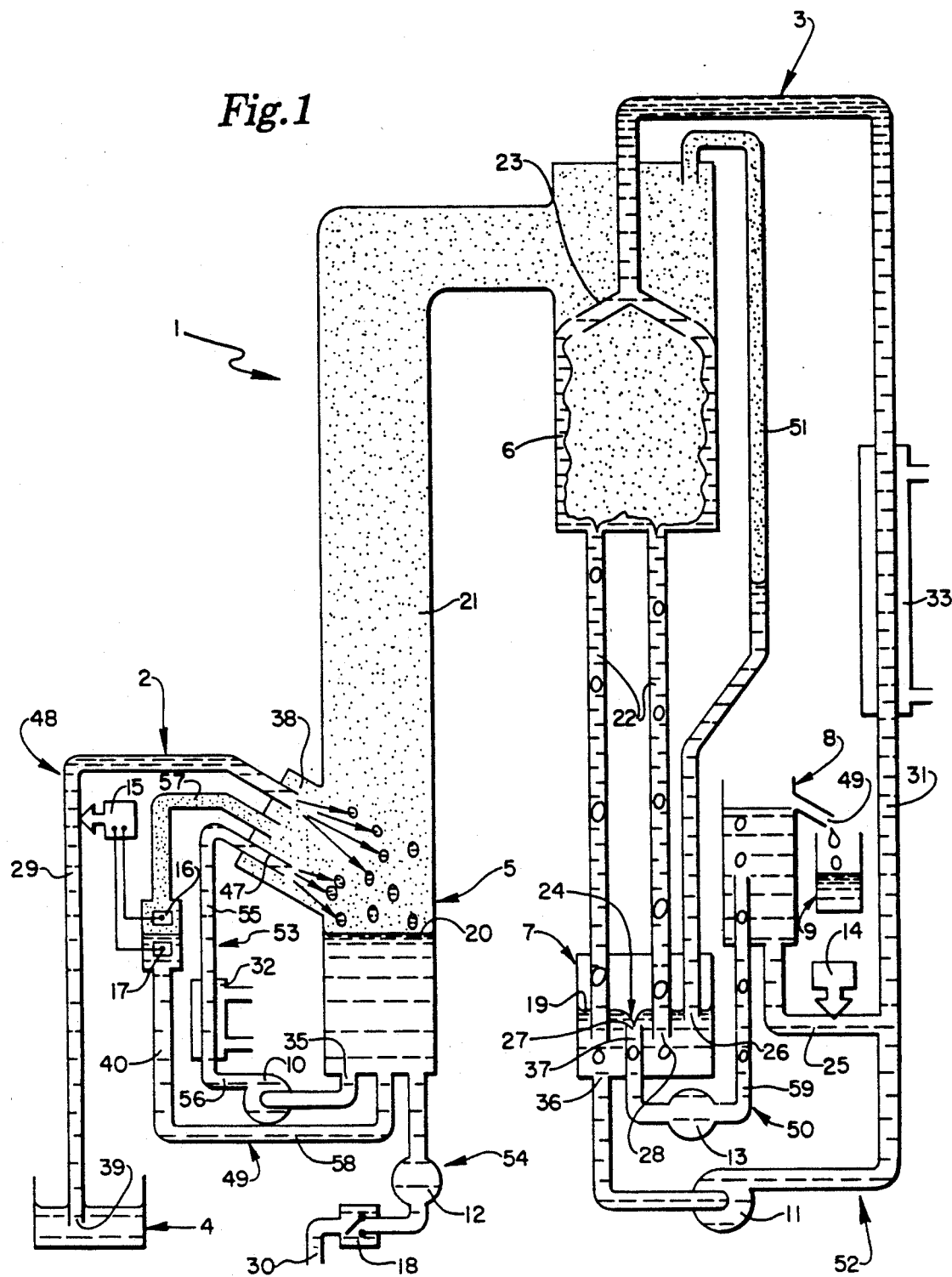
FIG. 1 is a schematic view of a distillation system embodying the present invention.

Referring now to the drawing, a preferred distillation system 1 according to the present invention is shown to generally comprise evaporation apparatus 2 and condensation apparatus 3. During operation, distillation system 1 takes raw liquid from a raw liquid container 4 for distillation in a boiling chamber 5 under reduced pressure. The vapor or gas that is produced in boiling chamber 5 is directed to condensation apparatus 3 for cooling and condensation. A final distillate product is delivered to a distillate collection vessel 9.

As used in this application, the phrase "raw liquid" refers to that fluid mixture from which a pure distillate is desired. "Spent liquid," on the other hand, refers to that fluid mixture residue in boiling chamber 5 that has been heated yet remains within boiling chamber 5.

Evaporation apparatus 2 includes boiling chamber 5, means 48 for supplying raw and circulated liquid to boiling chamber 5, means 49 for maintaining a liquid level in boiling chamber 5 at a predetermined level 20 and a connecting conduit 21 for directing vapors from boiling chamber 5 to condensation apparatus 3. Preferably, boiling chamber 5 is a vertical tube with an upwardly extending sidearm 38 located generally above liquid level 20 for receiving raw and circulated liquid.

Liquid supply means 48 communicates with sidearm 38 of boiling chamber 5 by way of a liquid supply conduit 29 having an inlet 39 in flow communication with a raw liquid supply source 4. A flow control valve 15 governs the flow of raw liquid to boiling chamber 5. The operation of supply valve 15 is described more fully hereinafter. Liquid supply means 48 can also include additional means 53 for circulating and heating raw and spent liquid from the lower portion of boiling chamber 5 and returning the liquid and any resulting vapor or gas back to boiling chamber 5, and a valved liquid outlet means 54 downstream of circulating and heating means 53 for discharging raw and spent liquid from boiling chamber 5.

Circulating and heating means 53 preferably includes a pump 10 with an entrance port 35 in flow communication with the lower portion of boiling chamber 5, a circulating raw liquid conduit 55 connected to pump 10, at one end 56, and, at another end 47, connected to sidearm 38 of boiling chamber 5. A heat exchanger 32 operatively coupled to conduit 55 is further provided for heating raw liquid that is pumped from boiling chamber 5 through conduit 55.

Heat exchanger 32 may be coupled to heat exchanger 33, discussed hereinafter, by a heat pump (not shown). Alternatively, heat exchanger 32 may be heated by any source of low grade heat such as a flat plate solar collector, or from an industrial process. The heated raw liquid, and any resulting vapor or gas, is returned to boiling chamber 5.

To prevent an air blockage at pump 10, entrance port 35 to pump 10 is completely flooded with liquid to prevent air or other noncondensed gas from entering pump 10. In addition, no control valves or other restrictions are used in the line except for the internal surface friction of the line itself. Because the pressure at entrance port 35 is generally the same as the pressure at the pump's exit port, pump 10 does not operate against a large pressure differential. A centrifugal pump is well suited for these conditions.

Valved liquid outlet means 54 includes a positive displacement pump 12 (preferably a gear pump) in flow communication between the lower portion of boiling chamber 5, on the one hand, and check valve 18 and drain conduit 30, on the other. Pump 12 slowly pumps spent liquid from boiling chamber 5 through drain conduit 30 to a drain. Valve 18, located near the exit port of pump 12, prevents drained liquid from backing up into boiling chamber 5 when the distillation apparatus is not in operation.

For the sake of simplicity, the structure of drain conduit 30 is not depicted in FIG. 1. Drain conduit 30, however, optimally leads upward to liquid level 20 and then turns downward and into the drain. A T-vent in drain conduit 30, located generally above liquid level 20, prevents the liquid in boiling chamber 5 from draining when distillation apparatus 1 is not in operation.

The above described valved liquid outlet means 54 pumps liquid from boiling chamber 5 to prevent a buildup of salts and other contaminants in boiling chamber 5. If pump 12 pumps liquid from boiling chamber 5 at a rate equal to the rate at which distillation enters into vessel 9, the salt concentration leaving boiling chamber 5 will be twice that of the raw liquid entering boiling chamber 5 from source 4.

As indicated above, evaporation apparatus 2 further includes means 49 for maintaining the liquid level in boiling chamber 5 at a predetermined level 20. Specifically, liquid level maintaining means 49 includes a liquid level leg 40 having an upper conduit 57, open to sidearm 38, and a lower conduit 58, open to a lower portion of boiling chamber 5 so that the liquid level in liquid level leg 40 is the same as that in boiling chamber 5. Float switches 16, 17 within liquid level leg 40 detect the liquid level and send control signals to flow control valve 15 when the liquid level in boiling chamber 5 rises or falls to the level of a float switch.

Consequently, valve 15 opens when the liquid level in boiling chamber 5 is below predetermined level 20 and closes when the liquid level in boiling chamber 5 is above predetermined level 20. When control valve 15 is opened, raw liquid is drawn into inlet 39 and through supply conduit 29 by the pressure difference between the atmosphere and the reduced pressure within distillation apparatus 1. Control valve 15 may be a solenoid valve or may be a variable position valve, positioned by an electric or pneumatic motor.

Turning now to condensation apparatus 3, vapor or gas from boiling chamber 5 is directed through connecting conduit 21 to a closed condensation chamber 6 located generally higher than boiling chamber 5. In chamber 6, the vapor or gas is received, cooled and condensed to a distillate. Connecting conduit 21 sealingly engages condensation chamber 6 such that condensation chamber 6 and boiling chamber 5 are vacuum tight.

At least one bubble tube 22 is sealingly connected to the lower portion of condensation chamber 6 for carrying distillate and noncondensed gas or vapor out of condensation chamber 6. The number of desired bubble tubes depends upon the amount of distillate to be produced. For stills producing less than a gallon of distillate per hour, there may be a dozen or less bubble tubes in parallel. Under certain conditions, it is possible that only one tube will suffice. However, for stills producing hundreds of gallons of distillate per day, there may be hundreds of bubbles tubes in parallel.

Bubble tubes 22 carry vapor or gas, in the form of bubbles, and distillate from condensation chamber 6 to a closed collection chamber 7. Closed collection chamber 7 is also vacuum tight. The bubbles should span the entire inside diameter of bubble tubes 22, especially at the upper ends of the bubble tubes 22 so that the distillate in bubble tubes 22 will not slide past the trapped bubbles. In this way, bubbles are carried downward along with the distillate into collection chamber 7.

To achieve this object, bubble tubes 22 should have an internal diameter generally equal to or less than the equilibrium diameter of the bubbles traveling within bubble tubes 22. Typically, the internal diameter of the bubble tubes 22 is approximately one inch, although the internal diameter of the bubble tubes 22 is at least 0.25 inches when the tubes are about 4 feet long.

Bubble tubes 22 sealingly engage and extend downward into collection chamber 7 to a level indicated as 28. Under normal operating conditions the liquid level within collection chamber 7 is indicated at 19. Level 28 is approximately 12 to 15 mm beneath level 19.

Leading from closed collection chamber 7 are first transfer means 50, a tube 51, and second transfer means 52.

Tube 51 serves an air bleed function. Tube 51, at one end, extends into collection chamber 7 with a bottom end thereof disposed at level 26, approximately 1 to 2 mm below liquid level 19. At its other end, tube 51 is connected to the upper portion of condensation chamber 6. The internal diameter of tube 51 should exceed the equilibrium diameter of any vapor or gas bubbles that may be carried upward in tube 51. In this way, only air, vapor or gas, and no distillate, will be carried through tube 51 to condensation chamber 6.

During the normal operating mode for distillation apparatus 1, the liquid level in collection chamber 7 is at level 19. When the liquid-gas interface is at this level, the liquid will seal the lower end of tube 51 to substantially prevent tube 51 from acting as an air bleed. Tube 51, therefore, functions as a major bleed mechanism only during the start-up of the distillation system, as will be explained more fully hereinafter. Small quantities, however, of vapor or gas may work their way through tube 51 when the apparatus is in operation.

First transfer means 50 conveys a mixture of vapor or gas and distillate from collection chamber 7 to an open container 8 via positive displacement pump 13 and conduit 59. When the mixture reaches open container 8, the noncondensed vapor or gas is released directly into the atmosphere.

Open container 8 is preferably located at a height slightly below that of condensation chamber 6. Distillate in container 8 will either be channeled to second transfer means 52 or will overflow through exit port 44 into a final distillate collection vessel 9.

Pump 13 is preferably a gear pump, or another type of positive displacement pump. Pump 13 pumps the distillate-vapor mixture from collection chamber 7 through conduit 59 into open container 8. Pump 13 has an entrance port 37 within collection chamber 7. Port 37 is positioned at level 27 approximately 7 to 8 mm beneath liquid level 19 and above the level of bottom ends of bubble tubes 22.

Second transfer means 52 communicates with the lower portion of collection chamber 7 and the upper portion of condensation chamber 6. Distillate from container 8 can be introduced into conduit 31 of means 52 through a branch conduit 25. This return system 52 supplies cooled distillate to condensation chamber 6 for condensing gas or vapor from boiling chamber 5. Transfer means 52 includes a centrifugal pump 11 with an entrance port 36 connected to the lower portion of collection chamber 7. Pump 11 pumps distillate from collection chamber 7 to a conduit 31. Conduit 31 is connected, at one end, to pump 11 and, at the other end, to the upper portion of condensation chamber 6. Heat exchanger 33 can be operatively coupled to conduit 31 for cooling the recycled distillate. Heat exchanger 33 may be coupled to heat exchanger 32 as previously described. Alternatively, heat exchanger 32 may be cooled by water from an open pond, for example.

Entrance port 36 to pump 11 is completely flooded by distillate, because the gas or vapor rises to the upper portion of collection chamber 7, leaving only distillate in the lower portion of chamber 7. Therefore, no air or other noncondensed gas will enter pump 11 to cause an air blockage.

As is true with pump 10, there are no control valves or other restrictions in the line except for the surface friction of the line itself. Because the pressure at entrance port 36 is approximately equal to the pressure at the pump's exit port, pump 11 does not pump against a large pressure differential. Under these conditions, a centrifugal pump is again optimum.

Conduit 25 includes a flow control valve 14 to govern the flow of distillate from open container 8. Its setting will determine the height of the liquid level in tube 51. The level in tube 51 is also the net liquid height in bubble tubes 22. The setting for valve 14 can be automatically controlled with a liquid sensing mechanism within tube 51 or it can be manually set.

Preferably, means 52 further includes a branched distillate distributor 23 connected to conduit 31 and located within condensation chamber 6. Distributor 23 causes the chilled distillate to flow down the inside walls of condensation chamber 6 providing a large surface area for the condensation of vapor or gas from boiling chamber 5.

Not shown in the drawing is a normally open air-bleed solenoid which can, in the preferred embodiment, be employed in boiling chamber 5. When energized, this solenoid closes to prevent air from entering the system. When the system is not in operation, the solenoid opens to let air enter the system. Otherwise, the vacuum in the system would suck liquid from open container 8 and source 4, mixing raw liquid from source 4 with distillate in container 8.

OPERATION

Prior to distillation apparatus 1 being initially operated, liquid must be manually added to the system. Pure distilled liquid is poured in container 8 until container 8 is filled. The liquid will run backward through pumps 11 and 13 and up into bubble tubes 22 to a level which is generally the same as the liquid level in open container 8. This will provide sufficient fluid for starting.

Boiling chamber 5 can be initially filled to liquid level 20 by turning inlet 39 upward and manually adding raw liquid. Inlet 39 is then returned to source 4. Once this initial filling operation has been accomplished there should be sufficient liquid in the distillation apparatus after every shutdown for any subsequent start-up.

When distillation apparatus 1 is activated, pumps 10, 11, 12 and 13 will start circulating liquid. Vapor or gas generated by heating and circulating means 53, in combination with boiling chamber 5, is directed from boiling chamber 5 through connecting conduit 21 to condensation chamber 6. In condensation chamber 6, the vapor or gas condenses on the cooled distillate that is travelling along the walls of condensation chamber 6. Any vapor or gas that is trapped in the distillate is carried through bubble tubes 22 to collection chamber 7.

In collection chamber 7, air, gas or vapor rises to the upper portion of collection chamber 7 forming an air-liquid boundary at level 19. Gear pump 13 removes this air along with a mixture of liquid by a slurping action at vortex 24. The position of inlet 37 beneath level 19 induces vortex 24.

As mentioned previously, pump 11 pumps against a very small pressure differential from start-up to normal operating conditions. Therefore, the flow from distributor 23 through bubble tubes 22 is high both at start-up and during normal operating conditions. Under these conditions, centrifugal pump 11 circulates liquid at a rate which can be more than 10 times as fast as a gear pump, having a motor with the same horsepower rating, in the same location would.

This high flow rate is desirable for two reasons. First, a high flow rate through heat exchanger 33 makes the heat exchanger, and the heat pump, more efficient. Second, a high flow rate through bubble tubes 22 improves the rate at which air and other noncondensed gases are pumped out of condensation chamber 6. This becomes especially important when the ultimate vacuum within the system is approached. As the ultimate vacuum is reached, the number of molecules of air in each bubble travelling through bubble tubes 22 decreases. With a decreased number of molecules, it is desirable to increase the number of bubbles in tubes 22 to compensate for the reduced number of molecules. The higher liquid flow rate caused by pump 11 insures that there will be a large number of bubbles traveling through bubble tubes 22.

If one selects a centrifugal pump of the proper size to obtain adequate flow through bubble tubes 22, this size will possibly pump air down the bubble tubes too fast during start-up and overwhelm gear pump 13. The abnormally large surge of air at start-up causes the liquid-gas interface at liquid level 19 to move downward because the air is filling the upper portion of collection chamber 7 faster than pump 13 can remove it. If means were not provided to preclude an unacceptable lowering of liquid level 19, level 19 would move downward past level 27 and completely expose entrance port 37 of gear pump 13 to air. Because the gears of pump 13 must be wetted to maintain a seal and be lubricated for operation, gear pump 13 will fail when no liquid is available. When gear pump 13 fails to remove air, the system cannot be evacuated and the entire distillation apparatus will fail.

The present invention eliminates this concern by employment, in the preferred embodiment, of tube 51. As explained above, the abnormal surge of air moving into the upper portion of collection chamber 7 during start-up pushes liquid level 19 downward. However, this liquid level will only move downward until it reaches level 26 at which point the end of tube 51 becomes exposed. With the end of tube 51 exposed, a path becomes available into which air from the upper portion of collection chamber 7 can escape back into condensation chamber 6, rather than pushing the fluid-air interface beneath level 27.

During start-up, vortex 24 remains present, although shortened, and entrance port 37 remains beneath the liquid-gas interface. Hence, liquid, along with air, can still enter the gear pump in a slurping fashion through vortex 24, wetting the gears of pump 13.

As gas or vapor is removed from boiling chamber 5, condensation chamber 6 and collection chamber 7, the density of the remaining vapor or gas decreases, and smaller quantities of vapor or gas travel through bubble tubes 22 per unit of time. In turn, the pumping efficiency of bubble tubes 22 decreases until the net amount of gas no longer overwhelms the ability of gear pump 13 to remove the gas.

When this condition is reached, the level of the liquid-gas interface rises until it reaches liquid level 19 sealing tube 51. The bubble tube and gear pump system will now operate in a mode for which it was designed to obtain the ultimate vacuum.

Figure 2:
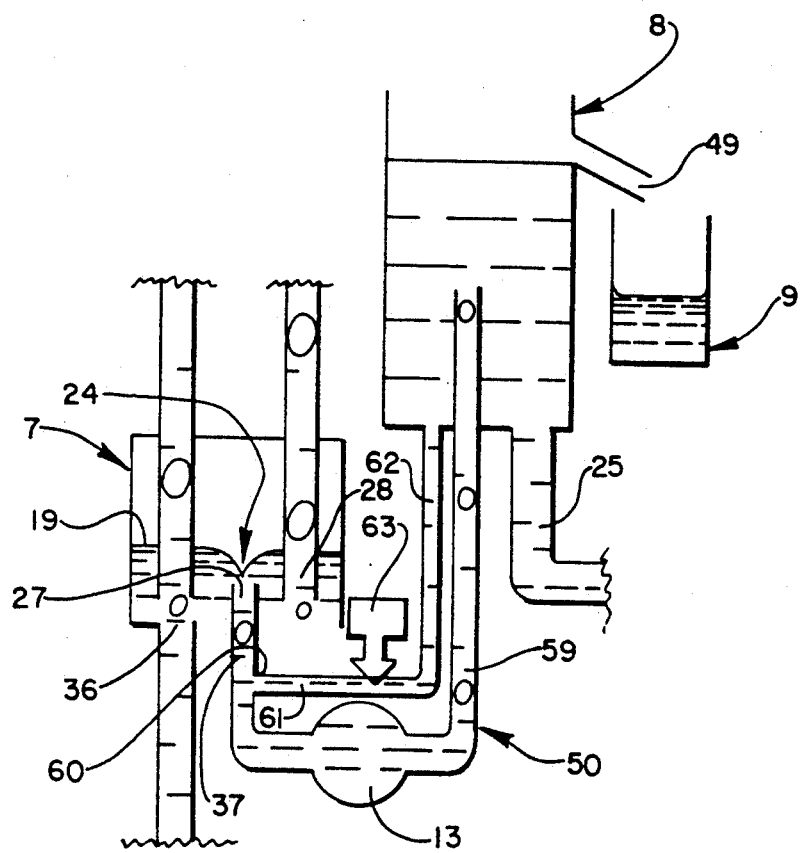
FIG. 2 is a schematic view of an alternative structure for maintaining a liquid level above a positive displacement pump at least at a minimum level.

FIG. 2 illustrates an alternate method of ensuring that the gears of gear pump 13 are wetted during start up. This method includes the insertion of a Tee 60 in port 37 in front of pump 13. The side arm 61 of the Tee 60 is connected by a conduit 62 to the bottom of open container 8. There is a flow control valve 63 in the line comprising side arm 61 and conduit 62. During start up, this flow control valve 63 is opened slightly to allow fluid to enter pump 13 through the Tee 60 and port 37 and thereby keeping the gears of the gear pump 13 wetted, even though the initial large flow of gas down the bubble tubes 22 has pushed the liquid-gas interface in collection chamber 7 down below the level 27 at port 37. After start up and after normal operating levels in chamber 7 are obtained, this flow control valve 63 can be closed.

Numerous characteristics and advantages of the invention covered by this document have been set forth in the foregoing description. It will be understood, however, that this disclosure is, in many respects, only illustrative. Changes may be made in details, particularly in matters of shape, size and arrangement of parts without exceeding the scope of the invention. The inventor's scope is, of course, defined in the language in which the appended claims are expressed.

What is claimed is:

1. An improved vacuum distillation device for purifying a raw liquid comprising:
   a) evaporation apparatus having a boiling chamber, means for supplying raw and circulated liquid to said boiling chamber, means for maintaining the liquid level in said boiling chamber at a predetermined level and means for conveying vapor or gas from said boiling chamber; and
   b) condensation apparatus including:
      (i) a closed condensation chamber above said boiling chamber and communicating with said conveying means for receiving, cooling and condensing said vapor or gas to a distillate;

(ii) a closed collection chamber below said condensation chamber;

(iii) at least one bubble tube sealing interconnecting a lower portion of said condensation chamber and an upper portion of said closed collection chamber and extending downward into said closed collection chamber to a predetermined level;

(iv) an open collection container for releasing vapor or gas to the atmosphere;

(v) first transfer means, sealingly engaged and extending, at one end thereof, into said closed collection chamber, and disposed at a level above said predetermined level, and connected, at an opposite end thereof, to said open container, for conveying a mixture of vapor, gas, and distillate from said closed collection chamber to said open container;

(vi) second transfer means sealingly engaged, at one end thereof, with the bottom of said closed collection chamber, and terminating, at an opposite end thereof, in said condensation chamber to convey only condensate or distillate and dispense condensate or distillate into said condensation chamber and cool said condensation chamber; and (vii) a tube, having a first end at a level, within said closed collection chamber, above said level of said end of said first transfer means extending into said closed collection chamber, and a second end sealingly connected to said condensation chamber, said tube having an internal diameter which exceeds the equilibrium diameter of gas, vapor, or air bubbles which are carried upward in said tube from said closed collection chamber to said condensation chamber.

2. The distillation device according to claim 1 wherein said at least one bubble tube has an internal diameter generally equal to or less than an equilibrium diameter of vapor or gas bubbles carried by said at least one bubble tube to said closed collection chamber.

3. The distillation device according to claim 2 wherein the internal diameter of said at least one bubble tube is at least 0.25 inches.

4. The distillation device according to claim 1 wherein said first transfer means includes a positive displacement pump for pumping a mixture of gas, vapor and distillate from said closed collection chamber to said open container.

5. The distillation device according to claim 4 wherein said positive displacement pump is a gear pump.

6. The distillation device according to claim 4 further comprising means for channeling a controlled flow of fluid from said open container to said positive displacement pump, wherein internal parts of said positive displacement pump are maintained in a wetted condition during start up.

7. The distillation device of claim 1 wherein said second transfer means comprises a centrifugal pump for pumping only distillate from said closed collection chamber to said condensation chamber and further comprises a distillate return conduit, said distillate return conduit connected at one end thereof to an outlet of said centrifugal pump, and sealingly connected, at the other end thereof, to an upper portion of said condensation chamber, and a heat exchanger operatively coupled to said distillate return conduit for cooling distillate passing therethrough.

8. The distillation device of claim 7 further comprising a branched distillate distributor carried by said distillate return conduit at said end connected within said condensation chamber, for applying cooled distillate to the walls of said condensation chamber such that a surface area is provided for condensation of the vapor or gas from said boiling chamber.

9. The distillation device according to claim 7 further comprising a conduit interconnecting the bottom of said open collection container and said distillate return conduit, and a flow control valve in said interconnecting conduit.

10. The distillation device according to claim 1 wherein the internal diameter of said tube is approximately one inch.

11. The distillation device according to claim 1 wherein said boiling chamber is oriented vertically, and has a controlled liquid level in a lower portion thereof and a side arm above said liquid level for receiving raw liquid from the liquid supply means; and wherein said liquid supply means comprises a conduit in fluid communication, at one end thereof, with a liquid supply source and, at an opposite end thereof, said boiling chamber, for carrying raw liquid to said boiling chamber, and means for circulating and heating liquid from said lower portion of said boiling chamber to said sidearm of said boiling chamber.

12. The distillation device according to claim 11 wherein said circulating and heating means comprises a centrifugal pump in fluid communication with the lower portion of said boiling chamber, a conduit connected to said pump at one end and at the other end connected to the sidearm of said boiling chamber, and a heat exchanger operatively coupled to said conduit for heating the raw liquid.

13. The distillation device according to claim 11 wherein said liquid supply means further comprises a supply flow control valve connected to said supply conduit and operatively coupled to said liquid level maintaining means for governing the flow of raw liquid into said boiling chamber from said supply conduit.

14. The distillation device according to claim 13 wherein said supply flow control valve is a solenoid valve.

15. The distillation device according to claim 13 wherein said supply flow control valve is a motorized flow control valve.

16. The distillation device according to claim 13 wherein said liquid level maintaining means comprises a pair of float switches within the flow in said circulating means, said pair of float switches being operatively coupled to said supply flow control valve such that the raw liquid supplied to said boiling chamber does not exceed the predetermined liquid level.

17. The distillation device according to claim 11 further comprising valved liquid outlet means including a positive displacement pump to pump spent liquid from the lower portion of said boiling chamber, and a drain conduit connected to said positive displacement pump and leading to a drain.

18. The distillation device according to claim 17 wherein said positive displacement pump is a gear pump.

* * * * *